(12) United States Patent
Kim et al.

(10) Patent No.: US 9,405,128 B2
(45) Date of Patent: Aug. 2, 2016

(54) EYEGLASSES

(75) Inventors: Yunjoo Kim, Pyeongtaek-si (KR);
Doyoung Kim, Pyeongtaek-si (KR);
Jeongpil Kim, Pyeongtaek-si (KR);
Jaeho Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 14/239,342

(22) PCT Filed: Aug. 17, 2012

(86) PCT No.: PCT/KR2012/006552
§ 371 (c)(1),
(2), (4) Date: Feb. 18, 2014

(87) PCT Pub. No.: WO2013/027972
PCT Pub. Date: Feb. 28, 2013

(65) Prior Publication Data
US 2014/0192310 A1    Jul. 10, 2014

Related U.S. Application Data

(60) Provisional application No. 61/525,195, filed on Aug. 19, 2011.

(30) Foreign Application Priority Data

Sep. 23, 2011 (KR) .......................... 10-2011-0096093
Nov. 11, 2011 (KR) .......................... 10-2011-0117329

(51) Int. Cl.
*G02C 5/08* (2006.01)
*G02C 9/04* (2006.01)

(52) U.S. Cl.
CPC ... *G02C 5/08* (2013.01); *G02C 9/04* (2013.01)

(58) Field of Classification Search
CPC ............. G02C 5/08; G02C 11/10; G02C 9/04
USPC ............................................... 351/126, 48, 58
See application file for complete search history.

(56) References Cited

U.S. PATENT DOCUMENTS 6,409,335 B1 * 6/2002 Lipawsky ................ G02C 5/06
351/124

FOREIGN PATENT DOCUMENTS

| JP | 2010-060714 A | 3/2010 |
|---|---|---|
| KR | 20-1999-0011765 U | 3/1999 |
| KR | 10-2006-0095700 A | 9/2006 |
| KR | 10-1115062 B1 | 3/2012 |
| WO | WO 93/02378 A1 | 2/1993 |
| WO | WO 01/40847 A1 | 6/2001 |

OTHER PUBLICATIONS

International Search Report dated Dec. 6, 2012 issued in Application No. PCT/KR2012/006552.

* cited by examiner

*Primary Examiner* — Bumsuk Won
*Assistant Examiner* — Wen Huang
(74) *Attorney, Agent, or Firm* — KED & Associates LLP

(57) ABSTRACT

The present disclosure relates to eyeglasses, more particularly, to eyeglasses the size of which can be reduced during storage and transportation and which can have improved wearing comfort for a user.

8 Claims, 20 Drawing Sheets

(a)

(b)

(a)

(b)

(a)

(b)

(a)

(b)

(a)

(b)

(a)

(b)

(a)

(b)

(a)

(b)

(a)

(b)

EYEGLASSES

TECHNICAL FIELD

The present invention relates to eyeglasses, more particularly, to eyeglasses the size of which can be reduced during storage and transportation and which can have improved wearing comfort for a user

BACKGROUND

Generally, a display device means a device for displaying a video signal input from an external device. Examples of such a display device include a monitor for displaying an image sent from a computer and a television for displaying video and audio signals transmitted from a broadcasting station and also all types of devices displaying an image input from an external device.

High definition large screen display devices are in the spotlight recently in which a flat panel display module (e.g., a liquid crystal display (LCD) and a plasma display panel (PDP)) is mounted.

Meanwhile, various contents including 3D movies, 3D sports broadcasting programs and 3D games associated with 3D technology are increasing, as 3D graphic contents are produced and display technology is developing. Accordingly, supply of display devices displaying 3D images is increasing more and more.

A stereoscopic image for representing a three dimensional image is reliant on a stereo vision of two eyes. Binocular disparity which is a distance between two eyes separated 65 mm apart is the most important factor.

Specifically, right and left human eyes are watching 2D images related to each other, respectively, and the two images are sent to the brain through the retina. The brain converges the images and represents the depth and reality of the 3D image. Such a human capacity is called "stereography".

A method for viewing a 3D image in a state of wearing specific eyeglasses (in other words, 3D eyeglasses or stereoscopic eyeglasses) is typically offered. The 3D eyeglasses may be classified into polarized eyeglasses, time-sharing eyeglasses and concentration difference eyeglasses. The polarized eyeglasses use a direction of polarized light vibration or rotation and the time-sharing eyeglasses alternatively offer right and left images and the concentration difference eyeglasses transmit lights having a different concentration to right and left eyes, respectively.

A user wearing eyeglasses for vision correction can additionally wear 3D eyeglasses to make the 3D eyeglasses overlapped with the eyeglasses for vision correction. Accordingly, the user usually wearing the eyeglasses for vision correction has to carry the 3D eyeglasses to view 3D graphic contents.

In addition, such the 3D eyeglasses have to be stored and displayed for spectators in a theater where a 3D movie is played.

However, the 3D eyeglasses are fixedly spread to be put on the user immediately such that it is inconvenient to keep or transport the 3D eyeglasses and that the 3D eyeglasses take much space.

Moreover, a fixed gap is between two lenses of the 3D eyeglasses such that it may be difficult for the user to adjust the gap between the lenses.

DISCLOSURE

Technical Problem

Exemplary embodiments of the present disclosure provide eyeglasses having a reduced volume in storage or transit.

Exemplary embodiments of the present disclosure also provide eyeglasses capable of enhancing user wear sensation.

Exemplary embodiments of the present disclosure also provide eyeglasses having enhanced durability and product reliability, when unfolded or folded.

Exemplary embodiments of the present disclosure also provide eyeglasses which allow a user to adjust a distance between lenses provided therein.

Technical Solution

To achieve these objects and other advantages and in accordance with the purpose of the invention, as embodied and broadly described herein, a control method of a laundry machine including a heat pump module having an evaporator, eyeglasses include a bridge; a first support member rotatably coupled to the bridge, with a first lens provided therein; a second support member rotatably coupled to the bridge, with a second lens provided therein; and a clip provided in the bridge or one of the support members, wherein the first and second support members are folded with respect to the bridge in a direction where the first and second lenses are getting closer.

A rail unit for guiding a folding passage may be provided in the bridge or one of the support members and a projected portion for moving along the rail unit is provided in the other.

The rail unit may include a guide portion for guiding the movement of the projected portion; and a pause portion formed in each of longitudinal ends of the guide portion to pause the movement of the projected portion so as to maintain an unfolded or folded state of the support member.

A stopper to contact with the folded support member may be provided in the bridge.

The guide portion may be a guide groove having a smaller depth than a height of the projected portion, and the pause portion is a receiving groove having a depth which is a height of the projected portion or more.

The guide portion may include at least one auxiliary receiving groove formed between both longitudinal ends of the guide groove, and when the projected portion is received in the auxiliary receiving groove, the support member is kept in a partially folded state between an unfolded state and a folded state.

The clip may include a first clip provided in the first support member and a second clip provided in the second support member, and free ends of the first and second clips are bent toward outer ends of the lenses, respectively.

A plurality of fixing protrusions may be provided in the bridge and an inserting portion is provided in the support member to insert the fixing protrusions therein, and the fixing protrusions and the inserting portion may be provided in corresponding positions which ease the inserting process in an unfolded or folded state of the support member.

The first and second support members may be folded to a front, rear, upper or lower side of the bridge in a direction the first and second lenses are getting closer.

In another aspect of the disclosure, eyeglasses includes a bridge comprising a rear surface in which one or more clips are provided; and first and second support members foldably coupled to a front surface of the bridge, with first and second lenses provided therein, respectively, and an angle between the lenses is adjusted according to a folding degree of one support member.

A rail unit for guiding a folding passage may be provided in the bridge or one of the support members and a projected portion for moving along the rail unit is provided in the other.

The rail unit may include a guide portion for guiding the movement of the projected portion; and a pause portion formed in each of longitudinal ends of the guide portion to pause the movement of the projected portion so as to maintain an unfolded or folded state of the support member.

The guide portion may be a guide groove having a smaller depth than a height of the projected portion, and the pause portion is a receiving groove having a depth which is a height of the projected portion or more.

In a further aspect of the disclosure, eyeglasses includes a first sliding member with a first lens provided therein; a second sliding member with a second lens provided therein; a bridge for connecting the first and second sliding members with each other, with at least one sliding member movably coupled thereto to adjust a gap between the first and second lenses; and a clip coupled to the bridge or one of the sliding members.

The eyeglasses may further include a flexible member for connecting the first and second sliding members with each other, wherein a plurality of penetrating holes are provided in the bridge along a direction where one of the sliding members slidingly moves, and projected portions are provided in the sliding member to be inserted in the penetrating holes.

The projected portions may be provided in the first and second sliding members, respectively, to be inserted in the penetrating holes.

A first rail for guiding the sliding movement of the sliding member may be provided in the bridge, and a second rail for moving along the first rail may be provided in the sliding member, and the first rail comprises a plurality of first protrusions, and the second rail may include a plurality of second protrusions, and a second protrusion may be arranged in a space formed between two neighboring first protrusions to couple the sliding member and the bridge to each other.

In a still further aspect of the disclosure, eyeglasses includes a bridge; a first sliding member slidingly coupled to one longitudinal end of the bridge; a second sliding member slidingly coupled to the other longitudinal end of the bridge; a first support member foldably coupled to the first sliding member, with a first lens provided therein, a second support member foldably coupled to the second sliding member, with a second lens provided therein; and one or more clips coupled to the bridge or one of the support members.

The eyeglasses may further include a flexible member for connecting the first and second sliding members with each other, wherein a plurality of penetrating holes are provided in the bridge along a direction where the first and second sliding members slidingly move, and projected portions are provided in the first and second sliding members to be inserted in the penetrating holes.

The first and second support members may be foldably coupled to the first and second sliding members toward a front, rear, upper or lower side of the bridge in a direction where the first and second lenses are getting closer.

A guide portion for guiding a folding passage may be provided in one support member or one sliding member and a projected portion for moving along the guide portion is provided in the other.

The guide portion may include a guide portion for guiding the movement of the projected portion; and a pause portion formed in each of longitudinal ends of the guide portion to pause the movement of the projected portion so as to maintain an unfolded or folded state of the support member.

The guide portion may be a guide groove having a smaller depth than a height of the projected portion, and the pause portion is a receiving groove having a depth which is a height of the projected portion or more.

The guide portion may include at least one auxiliary receiving groove formed between both longitudinal ends of the guide groove, and when the projected portion is received in the auxiliary receiving groove, the support member is kept in a partially folded state between an unfolded state and a folded state.

Advantageous Effects

According to the embodiments of the present disclosure, the eyeglasses according to the embodiments of the disclosure may have the reduced volume in transit and storage.

Furthermore, the eyeglasses according to the embodiments of the disclosure may enhance the wearing sensation.

Furthermore, the eyeglasses according to the embodiments of the disclosure may enhance durability and reliability when the user changes the folded state into the unfolded state vice versa.

Still further, the eyeglasses according to the embodiments of the disclosure may adjust the gap between the lenses. Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BEST MODE

Figure 1:
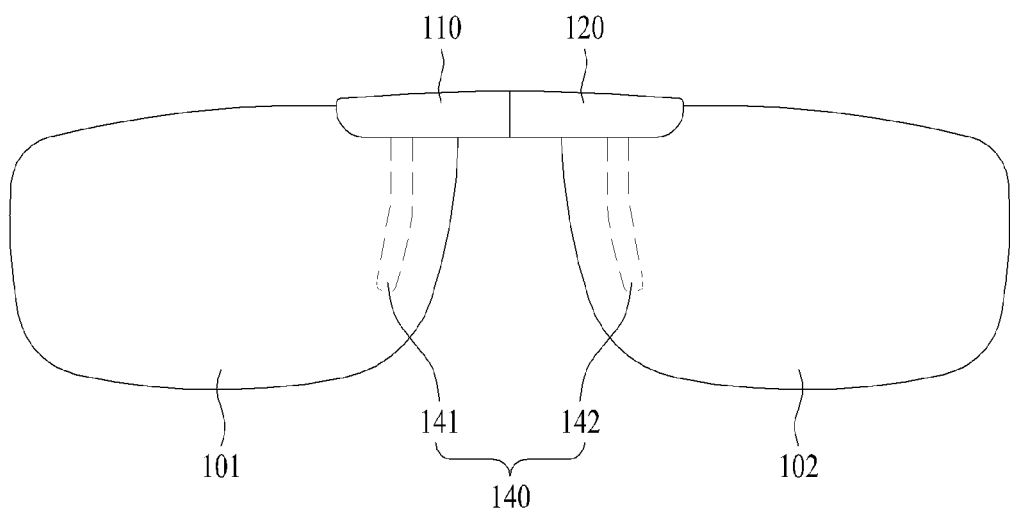
FIG. 1 is a front view of eyeglasses according to a first embodiment of the disclosure.

Eyeglasses according to a first embodiment of the disclosure includes a bridge, a first lens, a first support member and a second lens rotatably coupled to the bridge, a second support member rotatably coupled to the bridge and a clip provided in the bridge or one of the support members.

The first and second support members are folded with respect to the bridge along a direction in which the first and second lenses are getting closer.

A rail unit may be provided in the bridge or one of the support members to guide a folding passage and a projected portion may be provided in the other one to move along the rail portion.

The rail unit may include a guide portion for guiding the movement of the projected portion and a pause portion formed in each of longitudinal ends of the guide portion to pause the motion of the projected portion so as to keep a folded or unfolded state of the support members.

In addition, a stopper may be provided in the bridge to contact with the folded support member.

The guide portion may be a guide groove having a predetermined depth smaller than the height of the projected portion and the pause portion may be a receiving groove having a predetermined depth which is the height or more of the projected portion.

The guide portion may include one or more auxiliary receiving grooves formed between both longitudinal ends of the guide groove. When the projected portion is received in the auxiliary receiving groove, the support members may be kept partially folded between the unfolded and folded states.

The clip may include a first clip provided in the first support member and a second clip provided in the second support member. The first and second clips have free ends bending toward outer ends of the lenses.

A plurality of fixing protrusions may be provided in the bridge and an inserting portion may be provided in the support member to insert the fixing protrusions therein. The fixing protrusions and the inserting portion may be provided in proper positions where the fixing protrusions can be inserted in the inserting portion in the folded or unfolded state of the support member.

The first and second support members may be bendable to a front, back, upper or lower side of the bridge along a direction where the first and second lenses are getting closer.

According to another aspect of the disclosure, eyeglasses according to another embodiment may include a bridge having one or more clips provided in a back surface thereof and first and second support members coupled to a front surface of the bridge, with foldable to a front direction of the bridge, the first and second support members where first and second lenses are provided, respectively, such that an angle between the lenses can be adjusted according to a folding degree of one support member.

A rail unit for guiding a folding passage may be provided in the bridge or one of the support members and a projected portion may be provided in the other to move along the rail unit.

The rail unit may include a guide portion for guiding the movement of the projected portion and a pause portion formed in each of longitudinal ends of the guide portion to pause the motion of the projected portion so as to keep a folded or unfolded state of the support members.

The guide portion may be a guide groove having a predetermined depth smaller than the height of the projected portion and the pause portion may be a receiving groove having a predetermined depth which is the height or more of the projected portion.

In a further aspect of the disclosure, eyeglasses according to one embodiment may include a first sliding member where a first lens is coupled; a second sliding member where a second lens is coupled; a bridge for connecting the first and second sliding members with each other, in which at least one sliding member is movably coupled to adjust a gap between the first lens and the second lens; and a clip coupled to the bridge or one of the sliding members.

The eyeglasses may further include a flexible member for connecting the first and second sliding members with each other. A plurality of penetrating holes may be provided in the bridge along a direction of one moving sliding member and a projected portion may be provided in the one sliding member to be inserted in the penetrating holes.

A projected portion may be provided in each of the first and second sliding members to be inserted in the penetrating holes.

A first rail for guiding the sliding motion made by one of the sliding members may be provided in the bridge and a second rail for moving along the first rail may be provided in the sliding member. The first rail may include a plurality of first protrusions and the second rail may include a plurality of second protrusions. A second protrusion may be arranged in a space between two of the first protrusions, to fix the sliding member and the bridge.

In a still further aspect of the disclosure, eyeglasses according to one embodiment may include a bridge; a first sliding member movably coupled to one longitudinal end of the bride; a second sliding member movably coupled to the other longitudinal end of the bridge; a first support member foldably coupled to the second sliding member, with a second lens provided therein; and one or more clips coupled to the bridge or one of the support members.

The eyeglasses may further include a flexible member for connecting the first and second sliding members with each other. A plurality of penetrating holes may be provided in the bridge along a direction of the moving first and second sliding members and a projected portion may be provided in each of the sliding members to be inserted in the penetrating holes.

The first and second support members may be coupled to the first and second sliding members, respectively, to be folded with to a front, back, upper or lower side of the bridge in a direction where the first and second lenses are getting closer.

A guide portion may be provided in one of the support or sliding members to guide a folding passage and a projected portion may be provided in the other one.

The guide portion may include a guide portion for guiding the movement of the projected portion and a pause portion formed in each of longitudinal ends of the guide portion to pause the motion of the projected portion so as to keep a folded or unfolded state of the support members.

The guide portion may be a guide groove having a predetermined depth smaller than the height of the projected portion and the pause portion may be a receiving groove having a predetermined depth which is the height or more of the projected portion.

The guide portion may include one or more auxiliary receiving grooves formed between both longitudinal ends of the guide groove. When the projected portion is received in the auxiliary receiving groove, the support members may be kept partially folded between the unfolded and folded states.

Hereinafter, referring to the accompanying drawings, stereoscopic eyeglasses according to embodiments of the disclosure will be described in detail. The disclosed subject matter may, however, be embodied in many different forms and should not be construed as limited to the exemplary embodiments set forth herein. In the drawings, the size and relative sizes of layers and regions may be exaggerated for clarity.

Like reference numerals in the drawings denote like elements. It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section.

Thus, a first element, component, region, layer, or section discussed below could be termed a second element, component, region, layer, or section without departing from the teachings of the present disclosure. Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
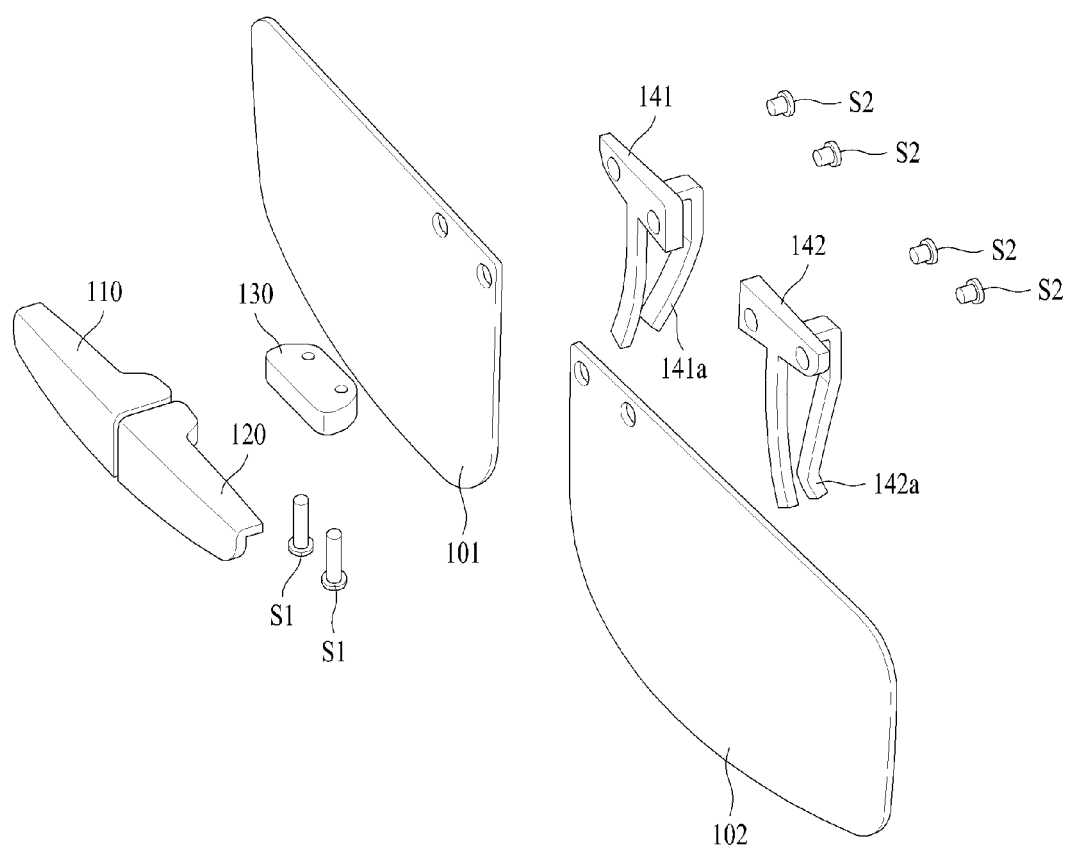
FIG. 2 is a cut-away perspective diagram of the eyeglasses according to the first embodiment of the disclosure.
Figure 3:
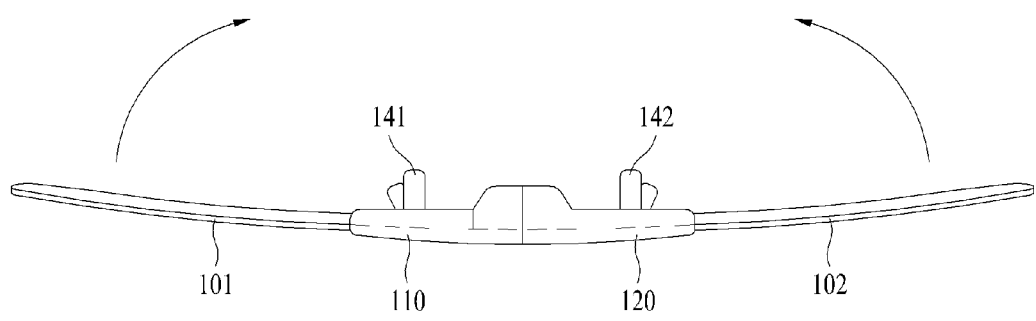
FIG. 3 is a plane diagram to describe an operation state of the eyeglasses according to the first embodiment of the disclosure.
Figure 3:
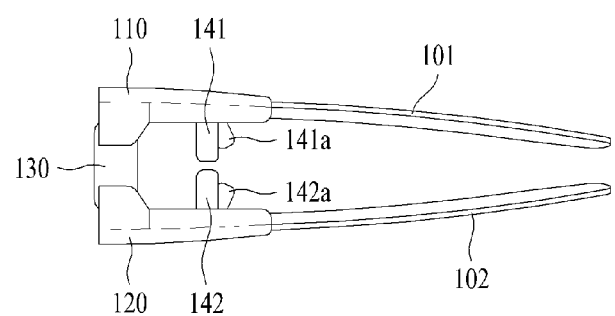

FIG. 1 is a front view of eyeglasses according to a first embodiment of the disclosure. FIG. 2 is a cut-away perspective diagram of the eyeglasses according to the first embodiment of the disclosure. FIG. 3 is a plane diagram to describe an operation state of the eyeglasses according to the first embodiment of the disclosure.

FIG. 3 (a) illustrates a folded state of the eyeglasses according to the first embodiment of the disclosure and FIG. 3 (a) illustrates a folded state of the folded eyeglasses according to the first embodiment of the disclosure.

Referring to FIGS. 1 and 2, the eyeglasses 100 according to the first embodiment of the disclosure includes a bridge 130; a first support member 110 foldably coupled to the bridge in a predetermined direction, in which a first lens 101 is provided; a second support member 120 foldably coupled to the bridge 130 in a predetermined direction, in which a second lens 102 is provided; and a clip 140 coupled to the bridge 130 or one of the support members to be selectively secured to a supporting object (show shown, e.g., eyeglasses for vision correction).

An angle of inclination of the corresponding lens 101 and/or 102 with respect to the bridge is changed according to a folded degree of one support member 110 and/or 120. An angle between the lenses 101 and 102 may be adjusted according to a folded degree of one support member 110 and/or 120 from the unfolded state. A gap between the lenses 101 and 102 and the user's eyes may be adjusted according to a folded degree of the support member 110 and/or 120 from the unfolded state in the state where the user is wearing the eyeglasses.

The first and second lenses 101 and 102 may be first and second polarized lenses 101 and 102 for viewing a 3D image.

Referring to FIG. 3, the first support member 110 and the second support member 120 can be folded toward a back side of the bridge 130 (toward the user) in a direction where the first and second lenses 101 and 102 are getting closer in a preset range of angles.

To minimize a volume in the folded state and to prevent the scratches caused by collision between the lenses 101 and 102, the support members 110 and 120 may be rotatably coupled to the bridge 130 to make the lenses 101 and 102 bendable at a 90 degree angle under the assumption that an angel of the lenses 101 and 102 with respect to the bridge in the unfolded state is 0 degree.

In addition, to prevent the scratches caused by the collision between the lenses 101 and 102, the lenses 101 and 102 shown in FIG. 3 have to keep a distance spaced apart therebetween while facing each other. For that, the support members 110 and 120 have to be coupled to the bridge 130 by a predetermined force, in the folded state.

To prevent the support members 110 and 120 from bending with respect to the bridge when the user wears the eyeglasses in the folded state, the support members 110 and 120 have to be fixed to the bridge 130 by a predetermined fixing force.

Meanwhile, the clip 140 may include a first clip 141 provided in the first support member 110 and a second clip 142 provided in the second support member 120. Free ends 141a and 141b of the first and second clips 141 and 142 may be selectively secured to a supporting object (e.g., eyeglasses for vision correction) by elasticity. The clip 140 may have a bar shape, especially, a bar shape having a bending area to have an elastic structure.

Specifically, when the free ends 141a and 141b are pressed in a direction to be getting distant from the lenses 101 and 102, a predetermined space is formed in each of the clips 141 and 142 and the supporting object is partially inserted in the space. After that, the pressure to the free ends 141a and 141b is removed and the free ends 141a and 141b elastically restitutes in a state of being inserted in the space. The free ends 141a and 141b may fix and press a predetermined portion of the supporting object.

When the clip 140 consists of the first clip 141 and the second clip 142, the clips 141 and 142 may be fixed to a pair of lenses provided in the eyeglasses for vision.

Referring to FIG. 2, the first clip 141 and the first support member 110 may be coupled to each other by one or more coupling means (S2) penetrating the first lens 101 arranged between the first clip and the first support member 110. The second clip 142 and the second support member 120 may be coupled to each other by one or more coupling means (S2) penetrating the second lens 102 arranged between the second clip 142 and the second support member 120.

Hereafter, a folding structure of the support members 110 and 120 with respect to the bridge 130 and a maintaining structure between the folded state and the unfolded state will be described in detail.

FIGS. 4 through 7 are perspective diagrams illustrating key parts of the eyeglasses according to the first embodiment of the disclosure. FIG. 8 is a rear view of the eyeglasses according to the first embodiment of the disclosure.

The first support member 110 and the second support member 120 have the same structure. Only the structure of the first support member 110 will be described.

Figure 4:
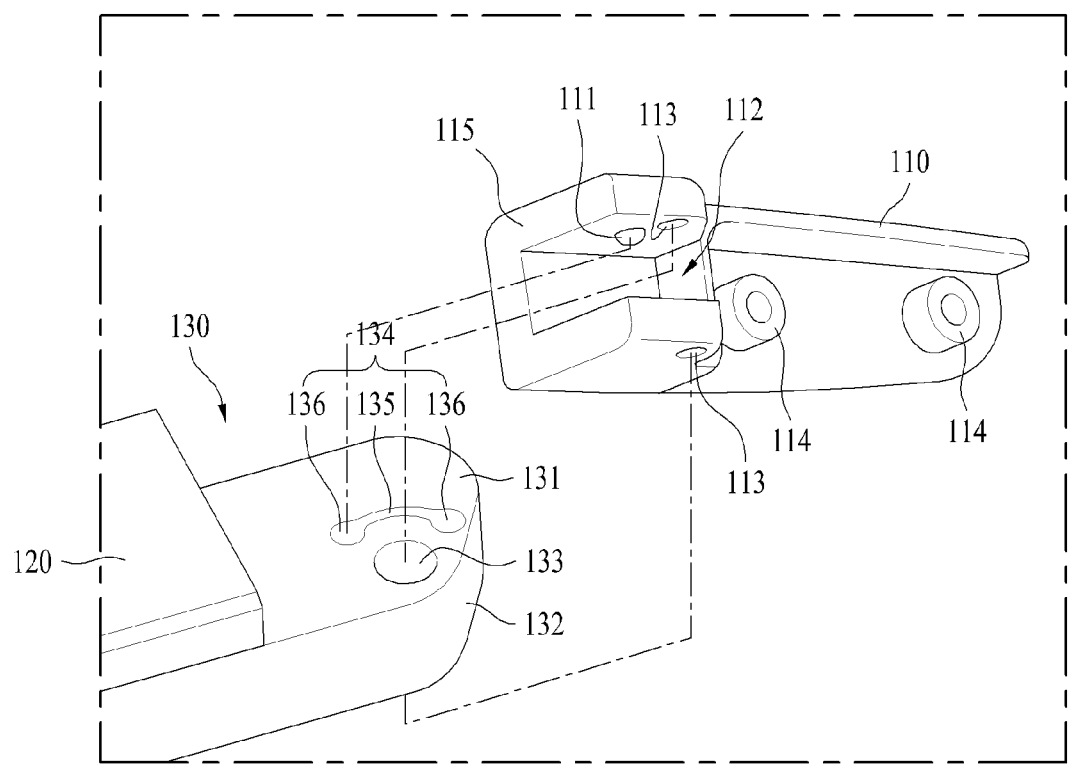
FIGS. 4 through 7 are perspective diagrams illustrating key parts of the eyeglasses according to the first embodiment of the disclosure.
Figure 5:
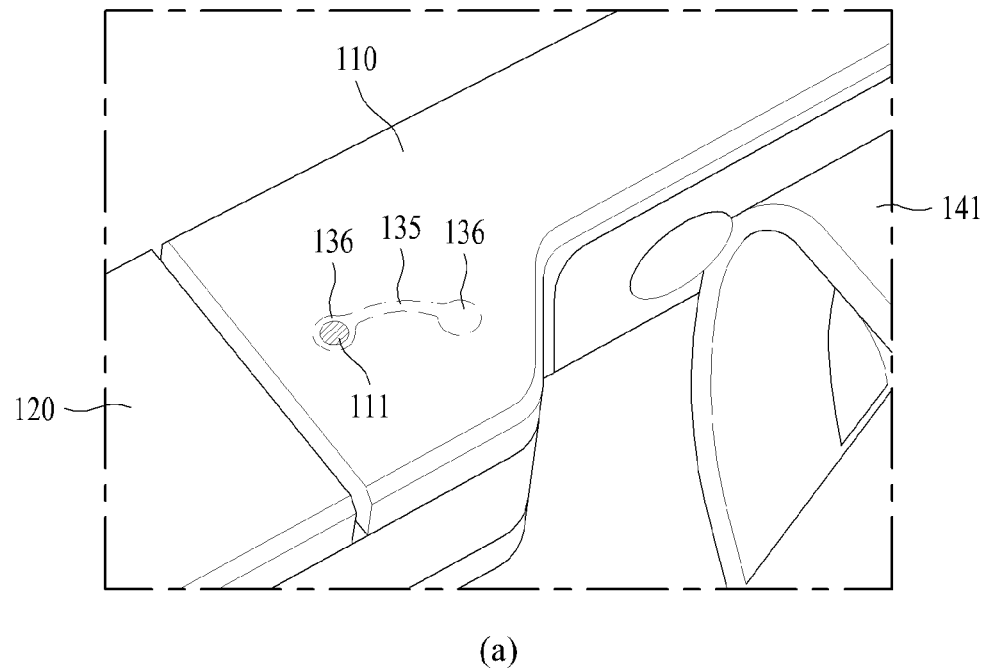
Figure 5:
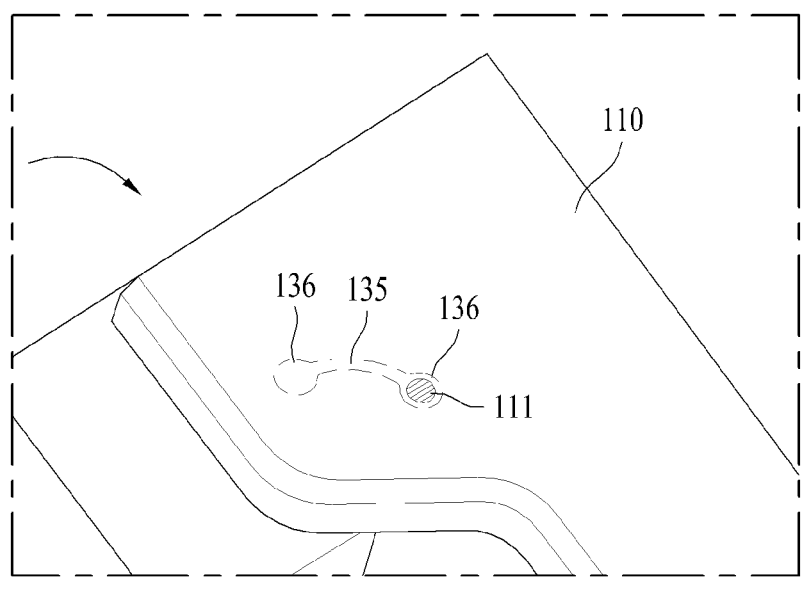

Referring to FIGS. 4 and 5, the rail unit 134 for guiding the folding passage may be provided in the bridge 110 or one of the support members 110 and 120. The projected portion 111 for moving along the rail unit 134 may be provided in the other one.

The rail unit 134 may include a guide portion 135 for guiding the movement of the projected portion 111 and a pause portion 136 formed in each of longitudinal ends of the guide portion 135 to pause the motion of the projected portion 111 so as to keep a folded or unfolded state of the support member 110.

In this instance, the guide portion 135 may be a guide groove having a predetermined depth smaller than the height of the projected portion and the pause portion 136 may be a receiving groove having a predetermined depth which is the height or more of the projected portion.

The guide portion 135 may include one or more auxiliary receiving grooves (not shown) formed between both longitudinal ends of the guide groove 135. When the projected portion 111 is received in the auxiliary receiving groove, the support member 110 may be kept partially folded between the unfolded and folded states.

Hereinafter, the bridge 130 and the first support member 110 will be described in detail. In this instance, the rail unit 134 is provided in the bridge 130 and the projected portion 111 is provided in the first support member 110.

As one example, the bridge 130 may have a shape of a block including a top surface 131, a bottom surface (no numerical reference) and a lateral surface 132 connecting the top surface 131 and the bottom surface with each other. At this time, the rail unit 134 may be formed in the top surface 131 of the bridge 130. Especially, the guide portion 135 may have a structure with a moving passage which is bent with a preset curvature.

The first support member 110 has a space 112 for partially receiving the bridge and one or more boss 114 which will be coupled to the first clip 141. Also, the first support member includes a coupling portion 115 to form the space 112 where the bridge 130 is partially received. The coupling portion 115 may have a shape covering one longitudinal end of the bridge 130 and a structure having an open portion along a folding direction of the first support member 110. For example, the coupling portion 115 may have a "⊏"-shaped cross section.

The bridge 130 and the first support member 110 may be connected with each other rotatably and foldably. Penetrating holes 133 and 113 may be formed in the bridge 130 and the first support member 110, respectively, to insert a shaft (S1) there through.

Referring to FIG. 5, when the user presses the first support member 110 toward a back side of the bridge 130, the projected portion 111 received in the receiving groove 136 formed in the center of the bridge 130 moves out of the receiving groove and moves along the guide groove, as shown in FIG. 5 (a). After that, once moving along the guide groove in the folded state, the projected portion 111 shown in FIG. 5 (b) may be inserted in the receiving groove 136 formed in the longitudinal end of the bridge 130. The guide portion 135 may be a guide groove having a smaller depth than the height of the projected portion 111 and the pause portion 136 may be a receiving groove having a larger depth than the height of the projected portion 111. When the projected portion 111 is moving along the guide groove, the first support member 110 and the bridge 130 moves in a state of being distant as far as a difference of the heights of the first support member 110 and the bridge 130 and reaches one receiving groove. After that, the projected portion 111 is getting inserted in the receiving groove and the first support member 110 and the bridge 130 may restore original states, with being spaced apart from each other.

As mentioned above, the guide portion 135 may include one or more auxiliary receiving grooves formed between both longitudinal ends of the guide groove 135. When the projected portion 111 is received in the auxiliary receiving groove, the support members may be kept partially folded between the unfolded and folded states. When the eyeglasses having such the structure are arranged, a beautiful appearance of the eyeglasses may be created the user can be provided with the use convenience as he or she can adjust angles of the lenses 101 and 102 with respect to the eyeglasses for vision correction.

Figure 6:
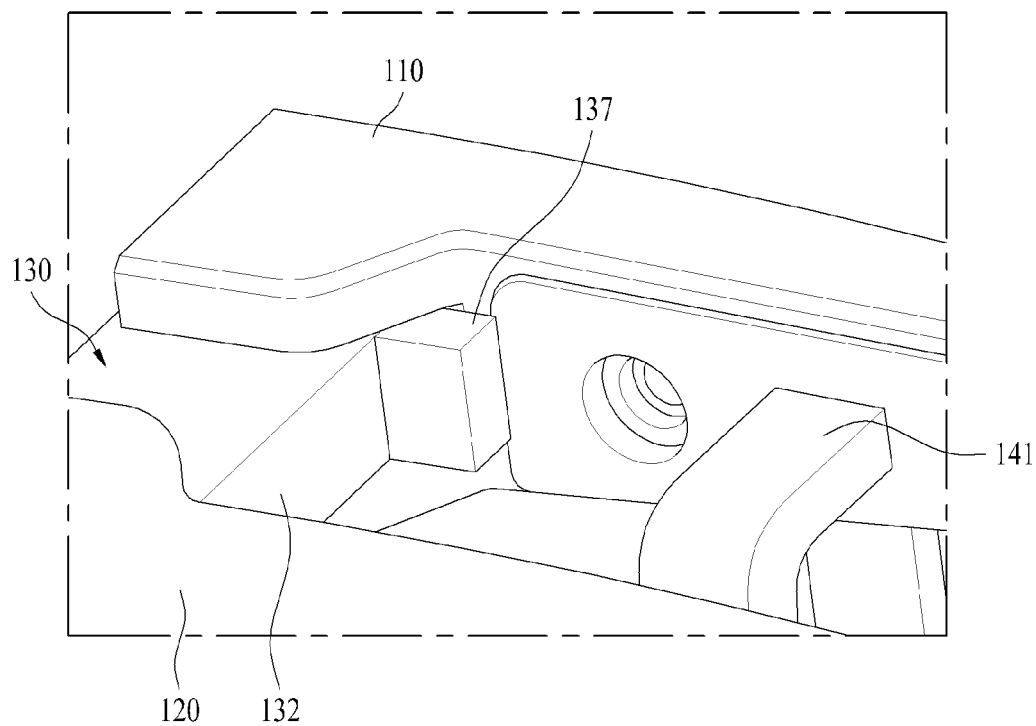

Meanwhile, the stopper 137 contactable with the folded support members 110 and 120 may be provided in the bridge. FIG. 6 shows the stopper 137 in contact with the first support member 110, when the folded first support member 110 is rotated. In this instance, the stopper 137 may stop the first support member 110 from rotating toward the inside of the bridge 130 any further. The projected portion 111 of the first support member 110 may be kept inserted in the receiving groove formed in the longitudinal end of the bridge 130 mentioned above.

Figure 7:
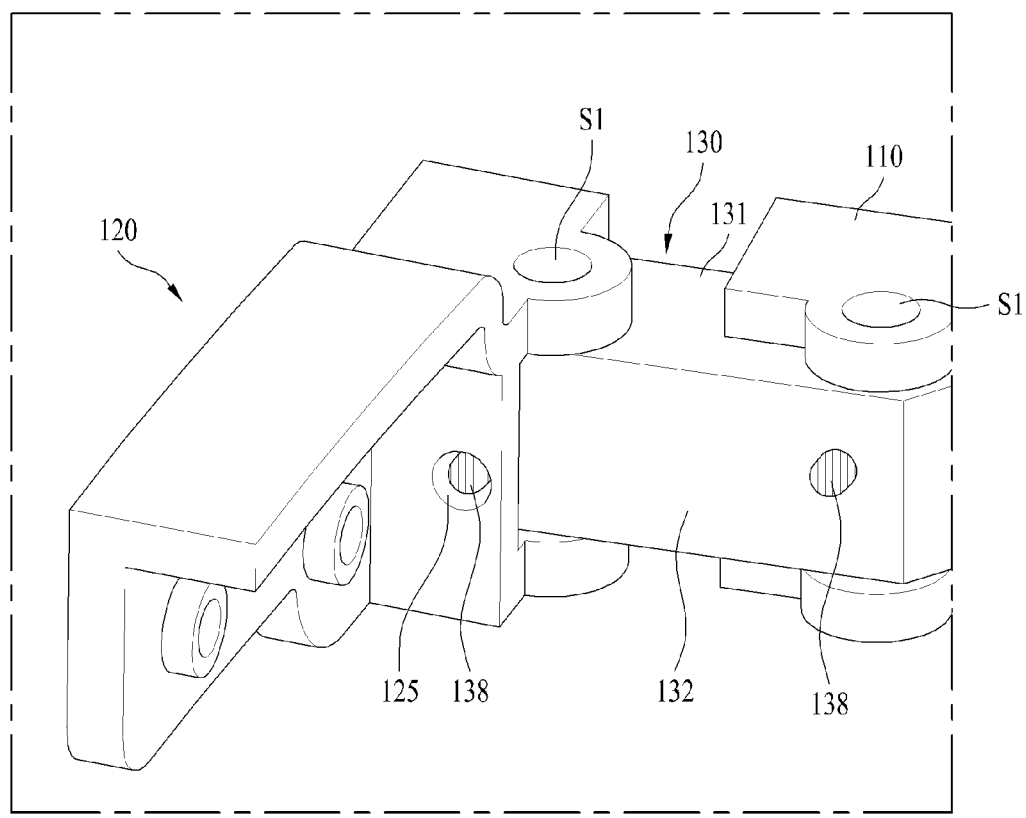
Figure 8:
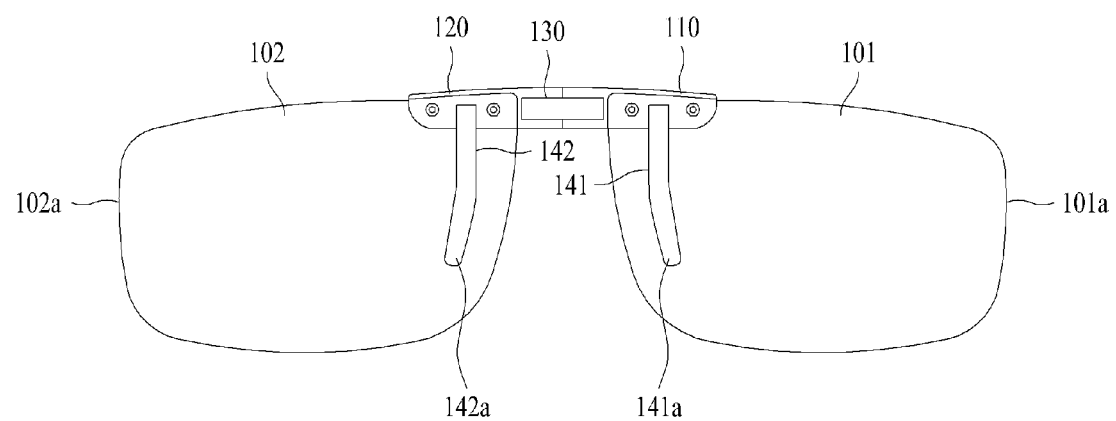
FIG. 8 is a rear view of the eyeglasses according to the first embodiment of the disclosure.

Alternatively, referring to FIG. 7, a plurality of fixing protrusions 138 may be provided in the bridge 130 and the inserting portion 125 may be provided in the second support member 138 to insert the fixing protrusions 138 therein. The fixing protrusions 138 and the inserting portion 125 may be provided in the positions which ease the inserting process in the folded and unfolded state of the second support member 120. The first support member 110 may have the same structure as the second support member 120.

At this time, the fixing protrusions 138 may be formed in the lateral surface 132 of the bridge 130 along a direction in which the second support member 120 is folded. The inserting portion 125 may be provided in portions of the second support member 120, corresponding to the lateral surface of the bridge 130. The inserting portion 125 may be a penetrating hole.

Accordingly, the structure for coupling the fixing protrusion 138 to the inserting portion 125 in the folded or unfolded state of the second support member 120 may be provided so as to maintain the folded or unfolded state of the second support member 120 with respect to the bridge 130.

At this time, the rail unit 134 mentioned above may be provided in the top surface 131 of the bridge 130 and the projected portion (not shown) for moving along the rail unit may be provided in the second support member 120.

Referring to FIG. 8, free ends 141a and 142a of the first clip 141 and the second clip 142 may be bending toward outer ends 101a and 102a of the lenses 101 and 102, respectively.

When an internal gap between the free end 141a of the first clip 141 and the free end 142a of the second clip 142 is kept 26 mm far after the eyeglasses 100 according to the embodiments of the disclosure are coupled to general eyeglasses, the user can wear the eyeglasses easily and comfortably. When the eyeglasses 100 according to the embodiments of the disclosure are coupled to eyeglasses having a special shape (e.g., rimless eyeglasses), it is preferred that the internal gap between the free end 141a of the first clip 141 and the free end 142a of the second clip 142 is kept 32 mm so as to avoid the interference of a fastening bolt provided in the rimless eyeglasses.

Figure 9:
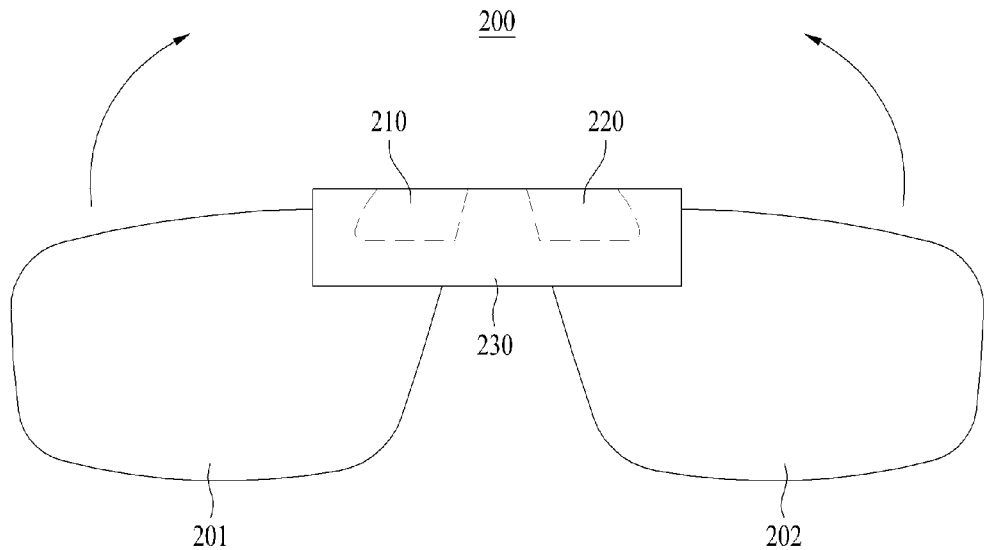
FIG. 9 is a conceptual diagram to describe an operation state of eyeglasses according to a second embodiment of the disclosure.
Figure 9:
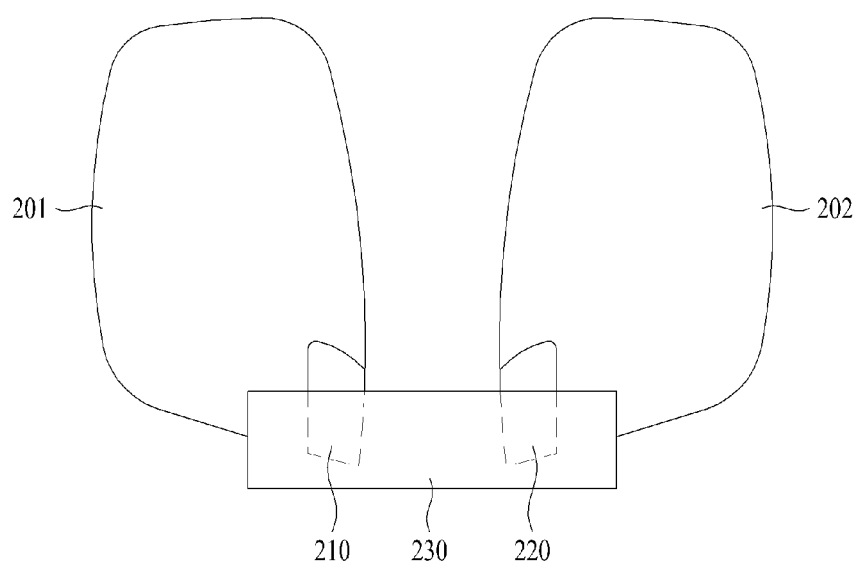

FIG. 9 is a conceptual diagram to describe an operation state of eyeglasses according to a second embodiment of the disclosure.

Eyeglasses 200 according to the second embodiment includes a first support member 210 in which a first lens 201 is provided; a second support member 220 in which a second lens 202 is provided; and a bridge 230 for connecting the first support member 210 and the second support member 220 with each other.

The eyeglasses 200 according to this embodiment have a similar structure to the eyeglasses 100 according to the first embodiment mentioned above. While the eyeglasses 100 according to the first embodiment has the structure which folds the first and second support members 110 and 120 toward the back side of the bridge 130, the eyeglasses 200 according to this embodiment has a structure that folds toward upper and lower sides of the bridge 230 in a direction where the first and second lenses 201 and 202 are getting closer in a preset range of angles.

In other words, only the direction in which the support members 210 and 220 are folded toward the bridge 230 is different and the folding structure and the structure of the stopper for maintaining the folded or unfolded state are the same as those of the first embodiment. Specifically, a rail unit for guiding a folding passage may be provided in the bridge 230 or one of the support members 210 and 220 and a projected portion for moving along the rail unit may be provided in the other one.

At this time, when provided in the bridge 230, the rail unit may be provided in a lateral surface of the bridge 230.

The rail unit may include a guide portion for guiding the movement of the projected portion and a pause portion formed in each of longitudinal ends of the guide portion to pause the motion of the projected portion so as to keep a folded or unfolded state of the support members 210 and 220. A stopper may be provided in the bridge 230 to contact with the support members 210 and 220 in a folded state.

Figure 10:
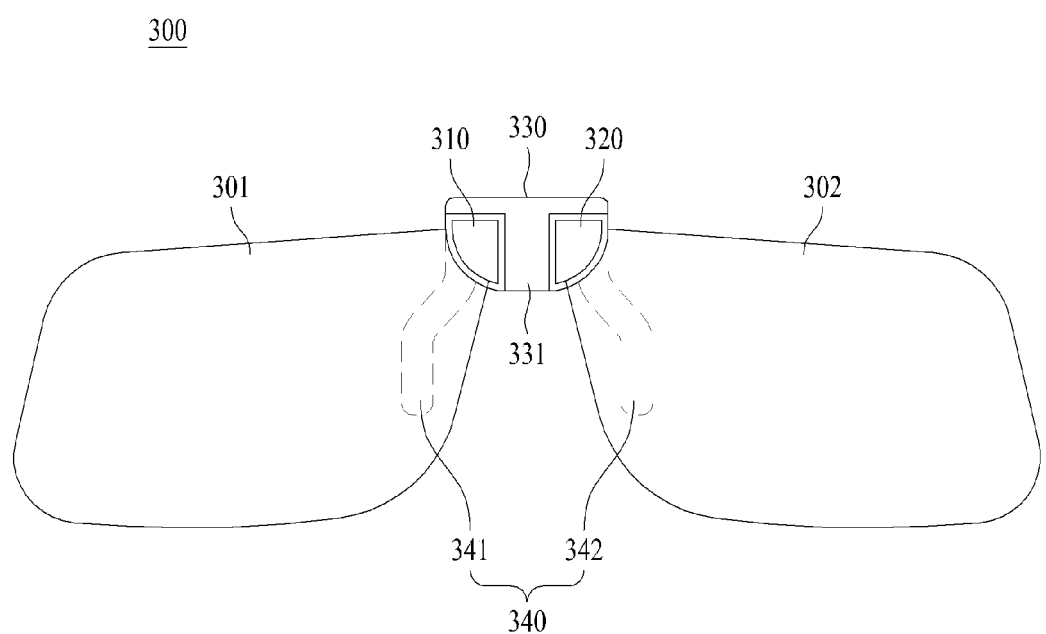
FIG. 10 is a front view of eyeglasses according to a third embodiment of the disclosure.
Figure 11:
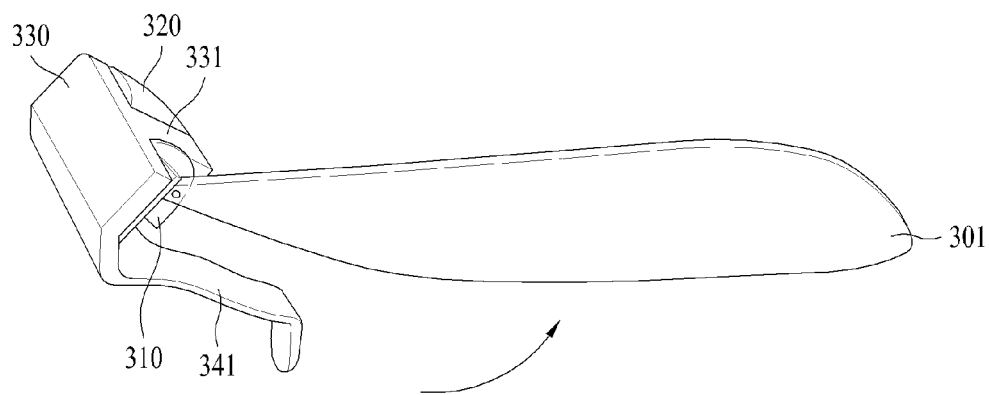
FIG. 11 is a perspective diagram to describe an operation state of the eyeglasses according to the third embodiment of the disclosure.
Figure 11:
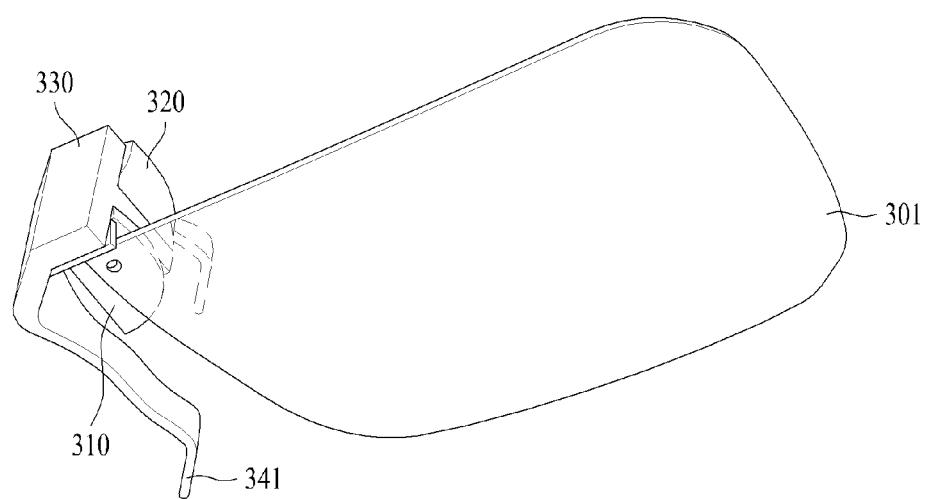

FIG. 10 is a front view of eyeglasses according to a third embodiment of the disclosure. FIG. 11 is a perspective diagram to describe an operation state of the eyeglasses according to the third embodiment of the disclosure.

Eyeglasses 300 according to the third embodiment of the disclosure includes a bridge 330 having a rear surface in which one or more clips 340 are provided; first and second support members 310 and 320 foldably coupled to a front surface 331 of the bridge 330, in which first and second lenses 301 and 302 are provided, respectively.

An angle between the lenses 301 and 302 may be adjusted according to a folding degree of one of the unfolded support member s310 and 320.

The eyeglasses 300 according to this embodiment have a similar structure to the eyeglasses 100 according to the first embodiment mentioned above. While the eyeglasses 100 according to the first embodiment has the structure which folds the first and second support members 110 and 120 toward the back side of the bridge 130, the eyeglasses 300 according to this embodiment has a structure that folds the first and second support members 310 and 320 toward upper and lower sides of the bridge 330 in a direction where the first and second lenses 301 and 302 are getting closer in a preset range of angles.

In other words, only the direction in which the support members 310 and 320 are folded toward the bridge 330 is different and the folding structure and the structure of the stopper for maintaining the folded or unfolded state are the same as those of the first embodiment. Specifically, a rail unit for guiding a folding passage may be provided in the bridge 330 or one of the support members 310 and 320 and a projected portion for moving along the rail unit may be provided in the other one.

The rail unit may include a guide portion for guiding the movement of the projected portion and a pause portion formed in each of longitudinal ends of the guide portion to pause the motion of the projected portion so as to keep a folded or unfolded state of the support members 310 and 320. A stopper may be provided in the bridge 330 to contact with the support members 310 and 320 in a folded state.

A first clip 341 and a second clip 342 may be provided in a rear surface of the bridge 330 of the eyeglasses 300 according to this embodiment, considering a rotation direction of the lenses 301 and 302 to minimize the volume of the folded eyeglasses 300.

For example, the bridge 300 may have a "T"-shaped front surface and recesses formed in both side portions of the front surface to rotatably receive the support members 310 and 320, respectively.

Figure 12:
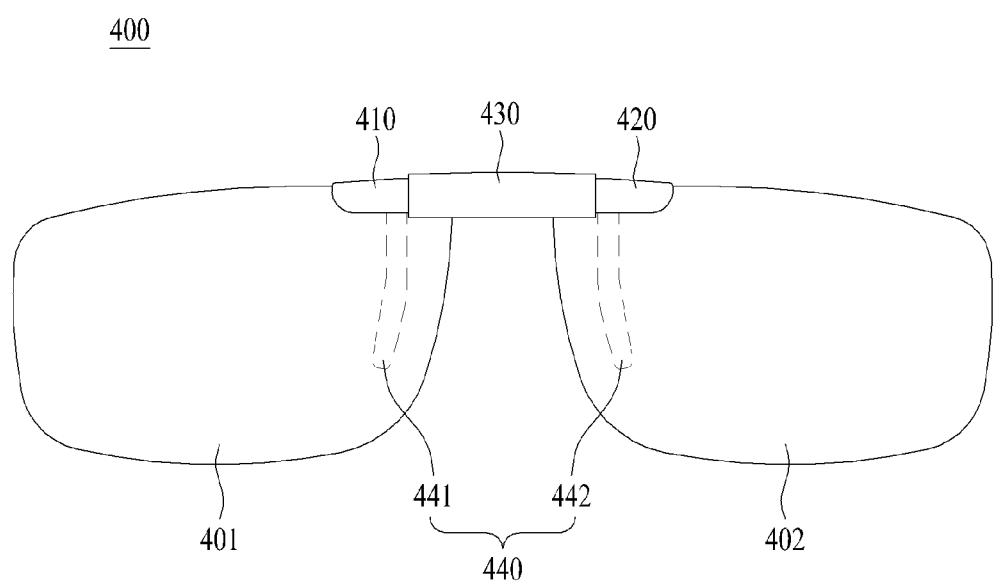
FIG. 12 is a front view of eyeglasses according to a fourth embodiment of the disclosure.
Figure 13:
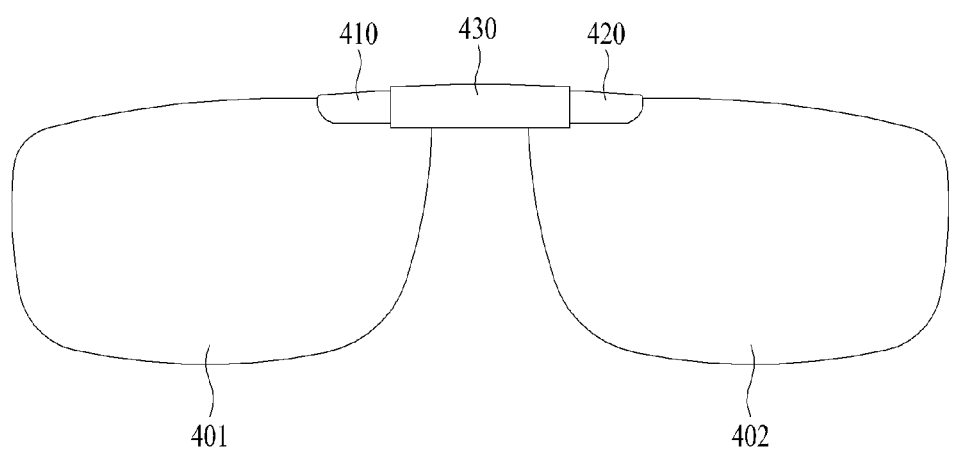
FIGS. 13 through 15 are conceptual diagrams to describe one operation state of the eyeglasses according to the fourth embodiment of the disclosure.
Figure 13:
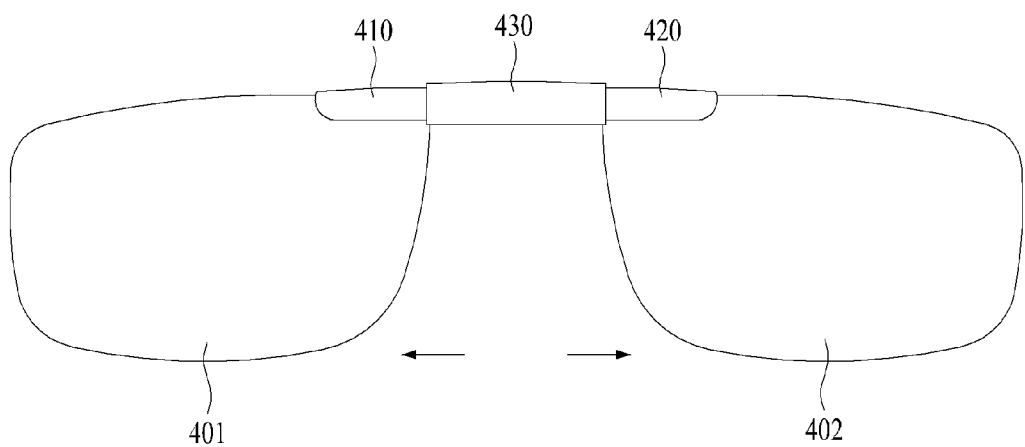
Figure 14:
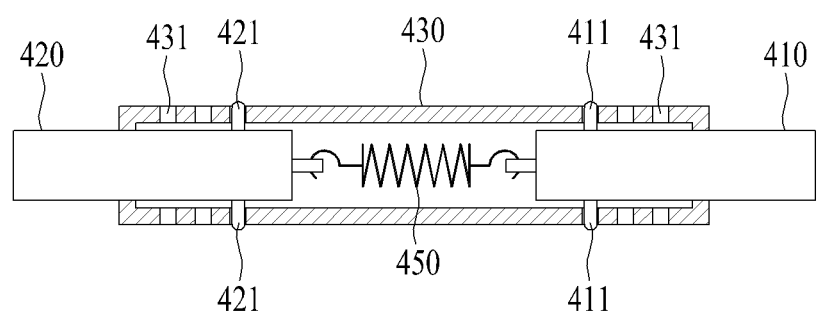
Figure 14:
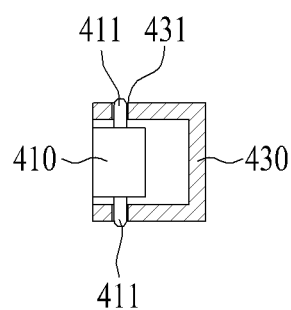
Figure 15:
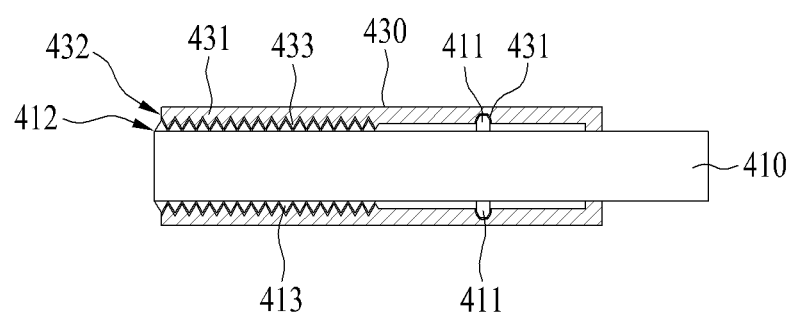
Figure 15:
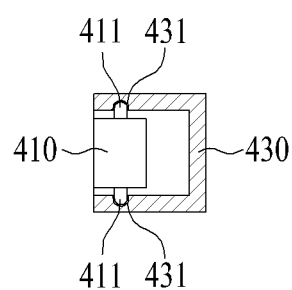

FIG. 12 is a front view of eyeglasses according to a fourth embodiment of the disclosure. FIGS. 13 through 15 are conceptual diagrams to describe one operation state of the eyeglasses according to the fourth embodiment of the disclosure.

Eyeglasses 400 according to the fourth embodiment of the disclosure includes a first sliding member 410 in which a first lens 401 is coupled; a second sliding member 410 in which a second lens 402 is coupled; and a bridge 430 for connecting the first and second sliding members 410 and 420 with each other, in which at least one sliding member is movably coupled to adjust a gap between the first lens 401 and the second lens 402; and a clip 440 coupled to the bridge 430 or one of the sliding members 410 and 420.

The first lens 401 and the second lens 402 may be a first polarized lens 401 and a second polarized lens 402 for viewing a 3D image.

The clip 440 may include a first clip 441 provided in the first sliding member 410 and a second clip 442 provided in the second sliding member 420. Free ends 441a and 441b of the first and second clips 441 and 442 may be selectively secured to a supporting object (e.g., eyeglasses for vision correction) by elasticity. The clip 440 may have a bar shape, especially, a bar shape having a bending area to have an elastic structure.

When the clip 440 consists of the first clip 441 and the second clip 442, the clips 441 and 142 may be fixed to a pair of lenses provided in the eyeglasses for vision.

Referring to FIGS. 12 and 13, the first sliding member 410 and the second sliding member 420 of the eyeglasses 400 according to the fourth embodiment of the disclosure may be movably coupled to the bridge 430. A gap between the first lens 401 and the second lens 402 may be adjusted as the first and second sliding members 410 and 420 are sliding.

To adjust the gap between the first lens 401 and the second lens 402, the first sliding member 410 or the second sliding member 420 may be movably coupled to the bridge 430. Both of the first and second sliding members 410 and 420 may be movably coupled to the bridge 430.

Hereinafter, referring to the drawings, the structure which slidingly moves the sliding members 410 and 420 with respect to the bridge 430 will be described in detail. In this instance, both of the first and second sliding members 410 and 420 are movably coupled to the bridge 430.

Referring to FIG. 14, the eyeglasses 400 may further include a flexible member 450 for connecting the first and second sliding members 410 and 420 with each other. A plurality of penetrating holes 431 may be provided in the bridge 430 along a direction of one moving sliding member 410 or 420 and a projected portion 411 and 412 may be provided in the one sliding member 410 or 420 to be inserted in the penetrating holes 431.

When both of the first and second sliding members 410 and 420 are movably coupled to the bridge 430, the plurality of the penetrating holes 431 may be provided in both longitudinal ends of the bridge 430 and the projected portions 411 and 412 may be provided in the sliding members 410 and 420, respectively.

The flexible member 450 may be coil spring and longitudinal ends of the coil spring may be fixed to the sliding members 410 and 420, respectively.

It is preferred that the thickness of the sliding members 450 may be smaller than that of the bridge. In a state where the projected portions 411 and 412 are separated from the penetrating holes 431, it is preferred that a preset space is formed between the sliding members 410 and 420 and the bridge 430 to as to slidingly move the sliding members.

For example, when sliding the first sliding member 410, the user separates the projected portion 411 of the first sliding member 410 from the penetrating hole 431 where the projected portion 411 is inserted currently and slidingly moves the first sliding member 410, considering the gap between the lenses 401 and 402. When the gap between the lenses 401 and 402 is adjusted, the projected portion 411 is inserted in the corresponding penetrating hole 431 such that the first sliding member 410 may be coupled to the bridge 430.

Alternatively, referring to FIG. 15, a first rail 432 for guiding a direction of the sliding member 410 or 420 is sliding may be provided in the bridge 430 and a second rail may be provided in the sliding member 410 or 420 to move along the first rail 432. Under the structure, no flexible member 450 such as the coil spring may be provided.

The first rail 432 may include a plurality of first protrusions 433 and the second rail 412 may include a plurality of second protrusions 413. A second protrusion 413 may be arranged in a space between two of the first protrusions 433, to fix the sliding member 410 and the bridge 430.

For example, when sliding the first sliding member 410, the user separates the projected portion 411 of the first sliding member 410 from the penetrating hole 431 where the projected portion 411 is inserted currently and slidingly moves the first sliding member 410, considering the gap between the lenses 401 and 402. At this time, the second rail 412 of the first sliding member 410 is guided along the first rail 432 of the bridge 430.

When the gap between the lenses 410 and 402 is adjusted, the projected portion 411 of the first sliding member 410 is inserted in the corresponding penetrating hole 431 such that the first sliding member 410 can be fixed to the bridge 430.

As mentioned above, the eyeglasses according to the embodiments of the disclosure may adjust the gap between the lenses and reduce the volume of the eyeglasses in transit and storage. Also, user wearing sensation may be enhanced as the gap between the lenses is adjusted.

Figure 16:
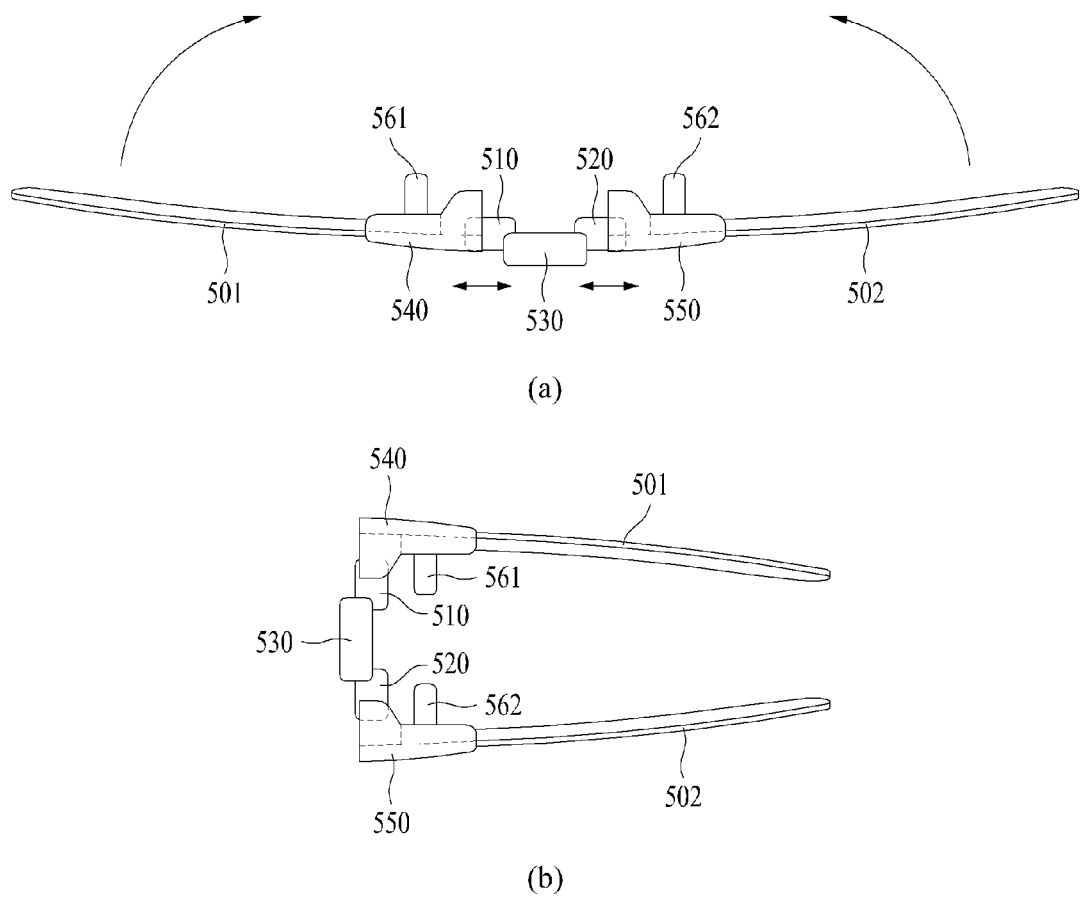
FIG. 16 is a plane diagram to describe one operation state of eyeglasses according to a fifth embodiment of the disclosure.

FIG. 16 is a plane diagram to describe one operation state of eyeglasses according to a fifth embodiment of the disclosure and FIGS. 17 through 20 are perspective diagrams illustrating key parts of the eyeglasses according to the fifth embodiment of the disclosure.

Referring to FIG. 16, eyeglasses 500 according to a fifth embodiment of the disclosure include a bridge 530; first and second sliding member 510 and 520 movably coupled to longitudinal ends of the bride 530, respectively; a first support member 540 foldably coupled to the first sliding member 510, with a first lens 501 provided therein; a second support member 550 foldably coupled to the second sliding member 520, with a second lens 502 provided therein; and one or more clips coupled to the bridge or one of the support members to be selectively secured to a supporting object.

Meanwhile, the structure which movably couples the first and second sliding members 510 and 520 with respect to the bridge 530 is the same as the structure of the eyeglasses 400 according to the fourth embodiment. Accordingly, detailed description of the repeated structure will be omitted.

An angle of inclination of the corresponding lens 501 and/or 502 with respect to the bridge is changed according to a folded degree of one support member 540 and/or 550. An angle between the lenses 501 and 502 may be adjusted according to a folded degree of one support member 540 and/or 550 from the unfolded state. A gap between the lenses 501 and 502 and the user's eyes may be adjusted according to a folded degree of the support member 540 and/or 550 from the unfolded state in the state where the user is wearing the eyeglasses.

The first and second lenses 501 and 502 may be first and second polarized lenses 501 and 502 for viewing a 3D image.

Referring to FIG. 16, the first support member 540 and the second support member 550 can be folded toward a back side of the bridge 530 (toward the user) in a direction where the first and second lenses 501 and 502 are getting closer in a preset range of angles.

To minimize a volume in the folded state and to prevent the scratches caused by collision between the lenses 501 and 502, the support members 540 and 550 may be rotatably coupled to the bridge 530 to make the lenses 501 and 502 bendable at a 90 degree angle under the assumption that an angel of the lenses 501 and 502 with respect to the bridge in the unfolded state is 0 degree.

In addition, to prevent the scratches caused by the collision between the lenses 501 and 502, the lenses 501 and 502 shown in FIG. 16 have to keep a distance spaced apart there between while facing each other. For that, the support members 540 and 550 have to be coupled to the bridge 530 by a predetermined force, in the folded state.

To prevent the support members 540 and 550 from bending with respect to the bridge when the user wears the eyeglasses in the folded state, the support members 540 and 550 have to be fixed to the bridge 530 by a predetermined fixing force.

Meanwhile, the clip may include a first clip 561 provided in the first support member 540 and a second clip 562 provided in the second support member 550.

Figure 17:
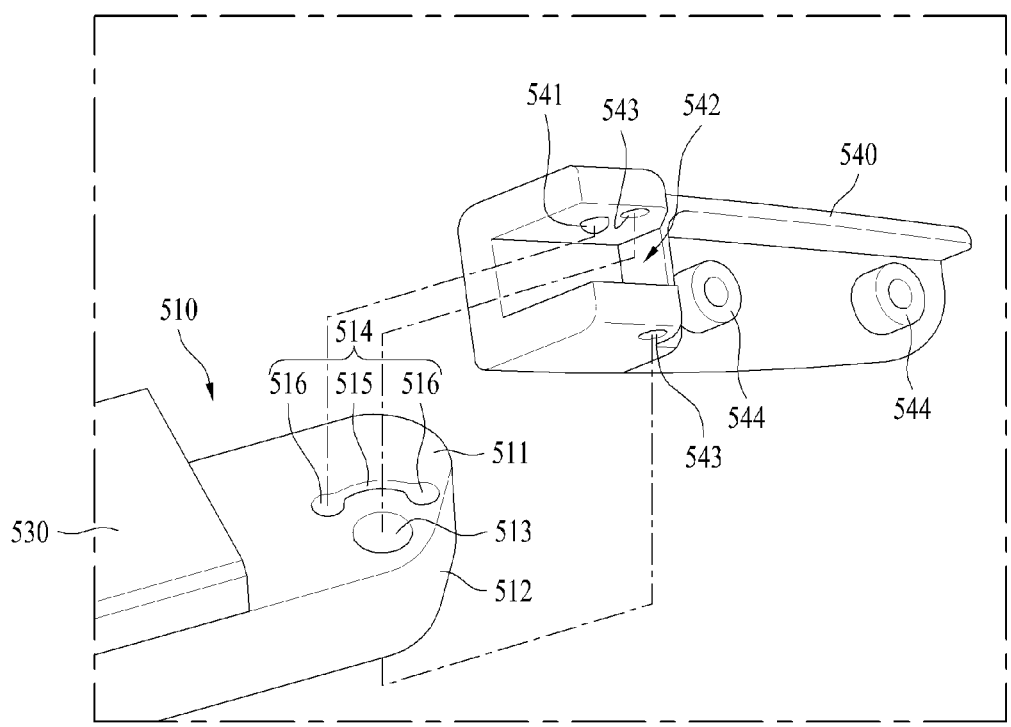
FIGS. 17 through 20 are perspective diagrams illustrating key parts of the eyeglasses according to the fifth embodiment of the disclosure.

Referring to FIG. 17 the first clip 561 and the first support member 540 may be coupled to each other by one or more coupling means penetrating the first lens 501 arranged between the first clip and the first support member 540. The second clip 562 and the second support member 550 may be coupled to each other by one or more coupling means penetrating the second lens 502 arranged between the second clip 562 and the second support member 550.

Hereafter, a folding structure of the support members 540 and 550 with respect to the sliding members 510 and 520, and a maintaining structure between the folded state and the unfolded state will be described in detail.

The first support member 540 and the second support member 550 have the same structure. Only the structure of the first support member 540 will be described.

As mentioned above, the first and second support members 540 and 550 may be coupled to the first and second sliding members 510 and 520, respectively, in a direction where the first and second lenses 510 and 502 are getting closer with respect to a front, rear, upper or lower direction of the bridge 530 in a range of angles.

Figure 18:
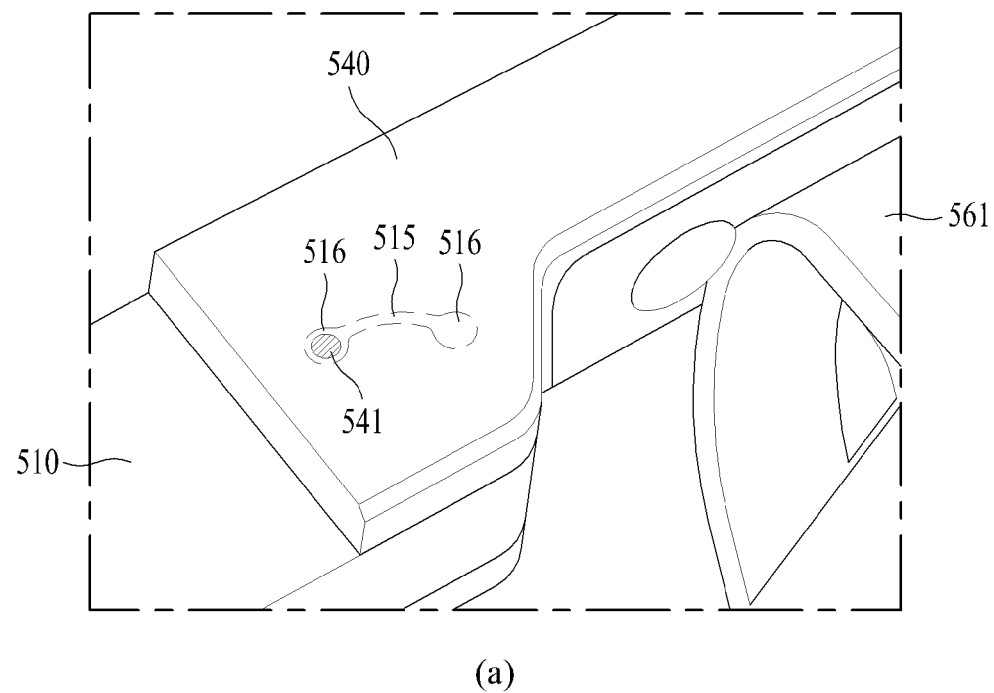
Figure 18:
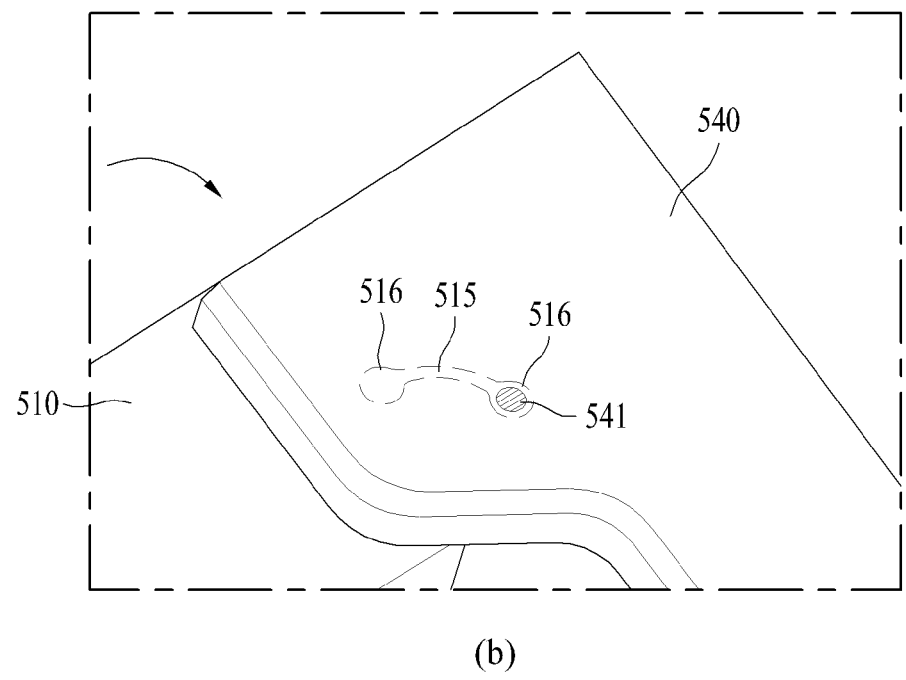

Referring to FIGS. 17 and 18, the guide portion 514 for guiding the folding passage may be provided in the support members 540 and 550 or one of the sliding members 510 and 520. The projected portion 541 for moving along the guide unit 514 may be provided in the other one.

The guide portion 514 may include a guide portion 515 for guiding the movement of the projected portion 541 and a pause portion 516 formed in each of longitudinal ends of the guide portion 515 to pause the motion of the projected portion 541 so as to keep a folded or unfolded state of the support member 540.

In this instance, the guide portion 515 may be a guide groove having a predetermined depth smaller than the height of the projected portion 541 and the pause portion 516 may be a receiving groove having a predetermined depth which is the height or more of the projected portion 541.

The guide portion 515 may include one or more auxiliary receiving grooves (not shown) formed between both longitudinal ends of the guide groove. When the projected portion 541 is received in the auxiliary receiving groove, the support member 540 and 550 may be kept partially folded between the unfolded and folded states.

Hereinafter, the first sliding member 510 and the first support member 540 will be described in detail. In this instance, the guide unit 514 is provided in the first sliding member 510 and the projected portion 541 is provided in the first support member 540.

As one example, the first sliding member 510 may have a shape of a block including a top surface 511, a bottom surface (no numerical reference) and a lateral surface 512 connecting the top surface 511 and the bottom surface with each other. At this time, the guide unit 214 may be formed in the top surface 511 of the first sliding member 510. Especially, the guide portion 514 may have a structure with a moving passage which is bent with a preset curvature.

The first support member 540 has a space 542 for partially receiving the bridge and one or more boss 542 which will be coupled to the first clip 561.

The first support member 540 is coupled to the first sliding member 510 rotatably and foldably. A shaft (not shown) for the rotation may pass through penetrating holes 513 and 543 and the penetrating holes are formed in the first sliding member 510 and the first support member 540, respectively.

Referring to FIG. 18, when the user presses the first support member 540 toward a back side of the first sliding member 510, the projected portion 541 received in the receiving groove 516 formed in the center of the first sliding member 510 moves out of the receiving groove and moves along the guide groove, as shown in FIG. 18 (a). After that, once moving along the guide groove in the folded state, the projected portion 541 shown in FIG. 18 (b) may be inserted in the receiving groove 516 formed in the longitudinal end of the first sliding member 510.

The guide portion 515 may be a guide groove having a smaller depth than the height of the projected portion 541 and the pause portion 516 may be a receiving groove having a larger depth than the height of the projected portion 541. When the projected portion 541 is moving along the guide groove, the first support member 540 and the first sliding member 510 moves in a state of being distant as far as a difference of the heights of the first support member 540 and the first sliding member 510 and reaches one receiving groove. After that, the projected portion 541 is getting inserted in the receiving groove and the first support member 540 and the first sliding member 510 may restore original states, with being spaced apart from each other.

As mentioned above, the guide portion 515 may include one or more auxiliary receiving grooves formed between both longitudinal ends of the guide groove. When the projected portion 541 is received in the auxiliary receiving groove, the support members may be kept partially folded between the unfolded and folded states. When the eyeglasses having such the structure are arranged, a beautiful appearance of the eyeglasses may be created the user can be provided with the use convenience as he or she can adjust angles of the lenses 151 and 502 with respect to the eyeglasses for vision correction.

Meanwhile, the stopper 517 contactable with the folded support members 110 and 120 may be provided in the bridge.

Figure 19:
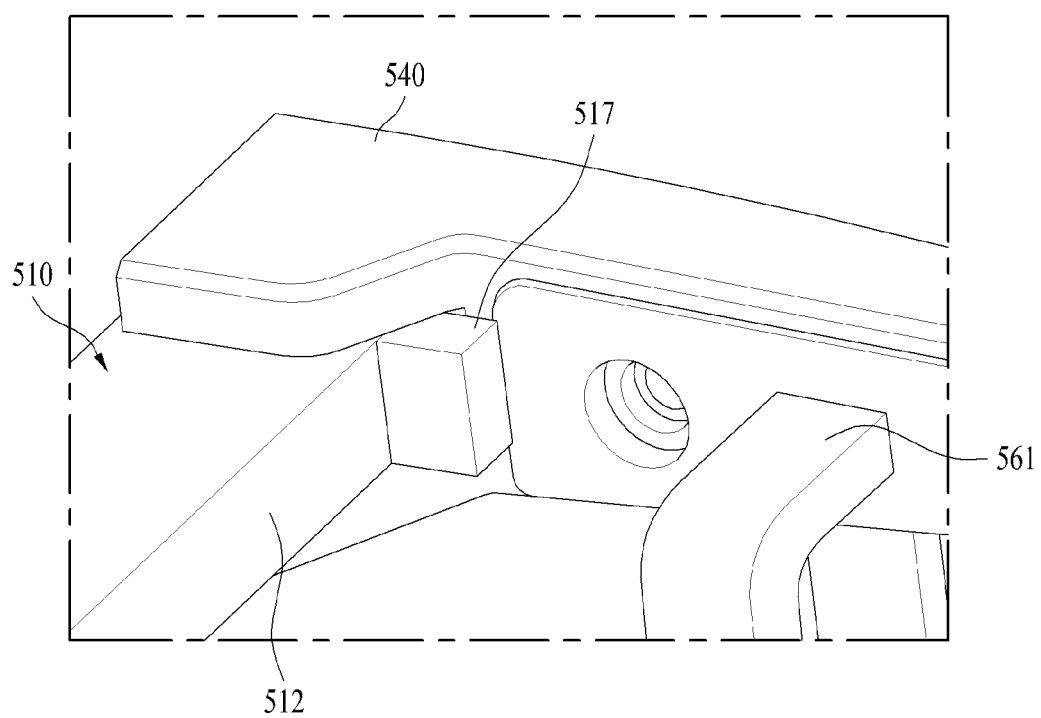

FIG. 19 shows the stopper 517 in contact with the first support member 540, when the folded first support member 540 is rotated. In this instance, the stopper 517 may stop the first support member 540 from rotating toward the inside of the first sliding member 510 any further. The projected portion 541 of the first support member 540 may be kept inserted in the receiving groove formed in the longitudinal end of the first sliding member 510 mentioned above.

Figure 20:
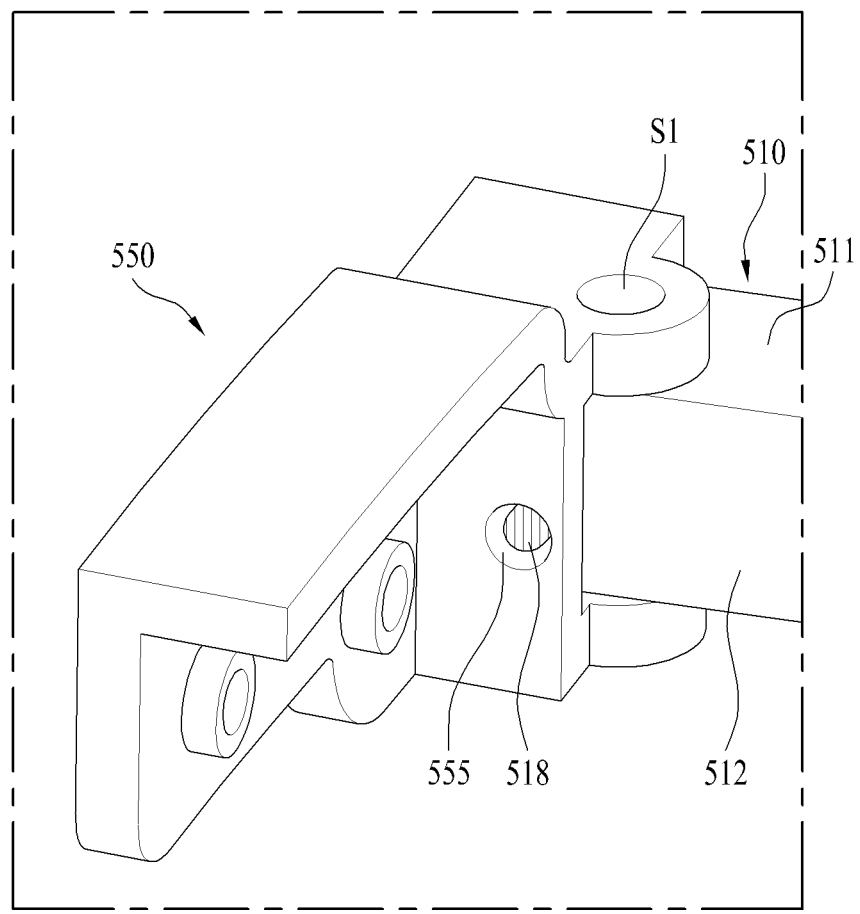

Alternatively, referring to FIG. 20, a plurality of fixing protrusions 518 may be provided in the first sliding member 510 and the inserting portion 555 may be provided in the second support member 550 to insert the fixing protrusions 518 therein. The fixing protrusions 518 and the inserting portion 555 may be provided in the positions which ease the inserting process in the folded and unfolded state of the second support member 550. The first support member 540 may have the same structure as the second support member 550.

At this time, the fixing protrusions 518 may be formed in the lateral surface 522 of the first sliding member 510 along a direction in which the second support member 550 is folded. The inserting portion 555 may be provided in portions of the second support member 550, corresponding to the lateral surface of the first sliding member 510. The inserting portion 555 may be a penetrating hole.

Accordingly, the structure for coupling the fixing protrusion 518 to the inserting portion 555 in the folded or unfolded state of the second support member 550 may be provided so as to maintain the folded or unfolded state of the second support member 550 with respect to the first sliding member 510.

As mentioned above, the eyeglasses according to the embodiments of the disclosure may adjust the gap between the lenses.

Furthermore, the eyeglasses according to the embodiments of the disclosure may have the reduced volume in transit and storage.

Furthermore, the eyeglasses according to the embodiments of the disclosure may enhance the wearing sensation.

Still further, the eyeglasses according to the embodiments of the disclosure may enhance durability and reliability when the user changes the folded state into the unfolded state vice versa.

Various variations and modifications of the refrigerator described above are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITIES

As mentioned above, the eyeglasses according to the embodiments of the disclosure may have the reduced volume in transit and storage.

Furthermore, the eyeglasses according to the embodiments of the disclosure may enhance the wearing sensation.

Furthermore, the eyeglasses according to the embodiments of the disclosure may enhance durability and reliability when the user changes the folded state into the unfolded state vice versa.

Still further, the eyeglasses according to the embodiments of the disclosure may adjust the gap between the lenses.

What is claimed is:

1. Eyeglasses comprising:
a bridge;
a first support member rotatably coupled to the bridge, with a first lens provided therein;
a second support member rotatably coupled to the bridge, with a second lens provided therein;
a clip provided in the bridge or one of the support members;
a rail unit for guiding a folding passage, the rail unit provided in one of the bridge or the support members; and
a projected portion for moving along the rail unit, the projected portion provided in the other one of the bridge or the support members,
wherein the rail unit includes:

a guide portion having a curved shape of a first curvature, the guide portion having a first longitudinal end and a second longitudinal end, said curved shape is for guiding the movement of the projected portion, said curved shape is not at the first longitudinal end or the second longitudinal end; and a pause portion at each of the first and second longitudinal ends of the guide portion to pause the movement of the projected portion so as to maintain an unfolded or folded state of the support member, wherein the first and second support members are folded with respect to the bridge in a direction where the first and second lenses are getting closer.

2. The eyeglasses of claim 1, wherein a stopper to contact the folded support member is provided in the bridge.

3. The eyeglasses of claim 1, wherein the guide portion is a guide groove having a smaller depth than a height of the projected portion, and the pause portion is a receiving groove having a depth which is a height of the projected portion or more.

4. The eyeglasses of claim 3, wherein the guide portion comprises at least one auxiliary receiving groove formed between the first and second longitudinal ends of the guide groove, and when the projected portion is received in the auxiliary receiving groove, the support member is kept in a partially folded state between an unfolded state and a folded state.

5. The eyeglasses of claim 1, wherein the clip comprises a first clip provided in the first support member and a second clip provided in the second support member, and free ends of the first and second clips are bent toward outer ends of the lenses, respectively.

6. The eyeglasses of claim 1, wherein a plurality of fixing protrusions are provided in the bridge and an inserting portion is provided in the support member to insert the fixing protrusions therein, and the fixing protrusions and the inserting portion are provided in positions corresponding to an unfolded or folded state of the support member.

7. The eyeglasses of claim 1, wherein the first and second support members are folded to a front, rear, upper or lower side of the bridge in a direction in which the first and second lenses are getting closer.

8. The eyeglasses of claim 1, wherein the projected portion is engaged with at least one of the guide portion or the pause portion.

* * * * *